INVENTOR.
BRUCE D. LUMMIS
BY W. J. Shanley Jr.
ATTORNEY

Oct. 5, 1965 B. D. LUMMIS 3,210,477

TWO-WAY TRUNK FOR INTERCONNECTING SWITCHBOARDS

Filed Jan. 26, 1962 3 Sheets-Sheet 2

United States Patent Office 3,210,477
Patented Oct. 5, 1965

3,210,477
TWO-WAY TRUNK FOR INTERCONNECTING SWITCHBOARDS

Bruce D. Lummis, Washington, D.C., assignor to General Dynamics Corporation, Rochester, N.Y., a corporation of Delaware Filed Jan. 26, 1962, Ser. No. 168,920
15 Claims. (Cl. 179—18)

This invention relates to trunk lines for interconnecting switchboards and, more particularly, to two-way trunk lines and the manner in which incoming and outgoing calls are connected between the two-way trunk and the switchboard.

Various systems are utilized in the prior art for handling the incoming and outgoing calls between a switchboard and a two-way trunk line. In a more complex system, incoming calls from the two-way trunk are routed to an incoming connector while the outgoing calls are handled by an outgoing connector. In other systems, the incoming calls terminate on a line circuit and are thereafter handled in the same manner as would a call being initiated by a subscriber within the board going off-hook. In these latter systems, the outgoing calls are handled over a separate path from the line circuit that handles the incoming calls. Such systems are unduly cumbersome and, not infrequently, end up in a "head-on" situation wherein calling subscribers in each board attempting to utilize the trunk line end up being in conversation with each other.

It is, therefore, an object of my invention to improve and simplify the manner for interconnecting a two-way trunk line with a switchboard.

It is a further object of my invention to eliminate "head-on" calls over a two-way trunk between two switchboards.

It is a further object of my invention to provide operation of a two-way trunk via a single line circuit path of access to the switchboard.

It is a further object of my invention to provide by-path busying of the switchboard line during finder action to reach the calling trunk line.

It is still another object of my invention to provide a means for delaying the lockout of means for seizing the trunk line at a called switchboard for a sufficient length of time subsequent to line busying to prevent a "head-on" conversation due to a switching connector in the called switchboard.

Figure 1:
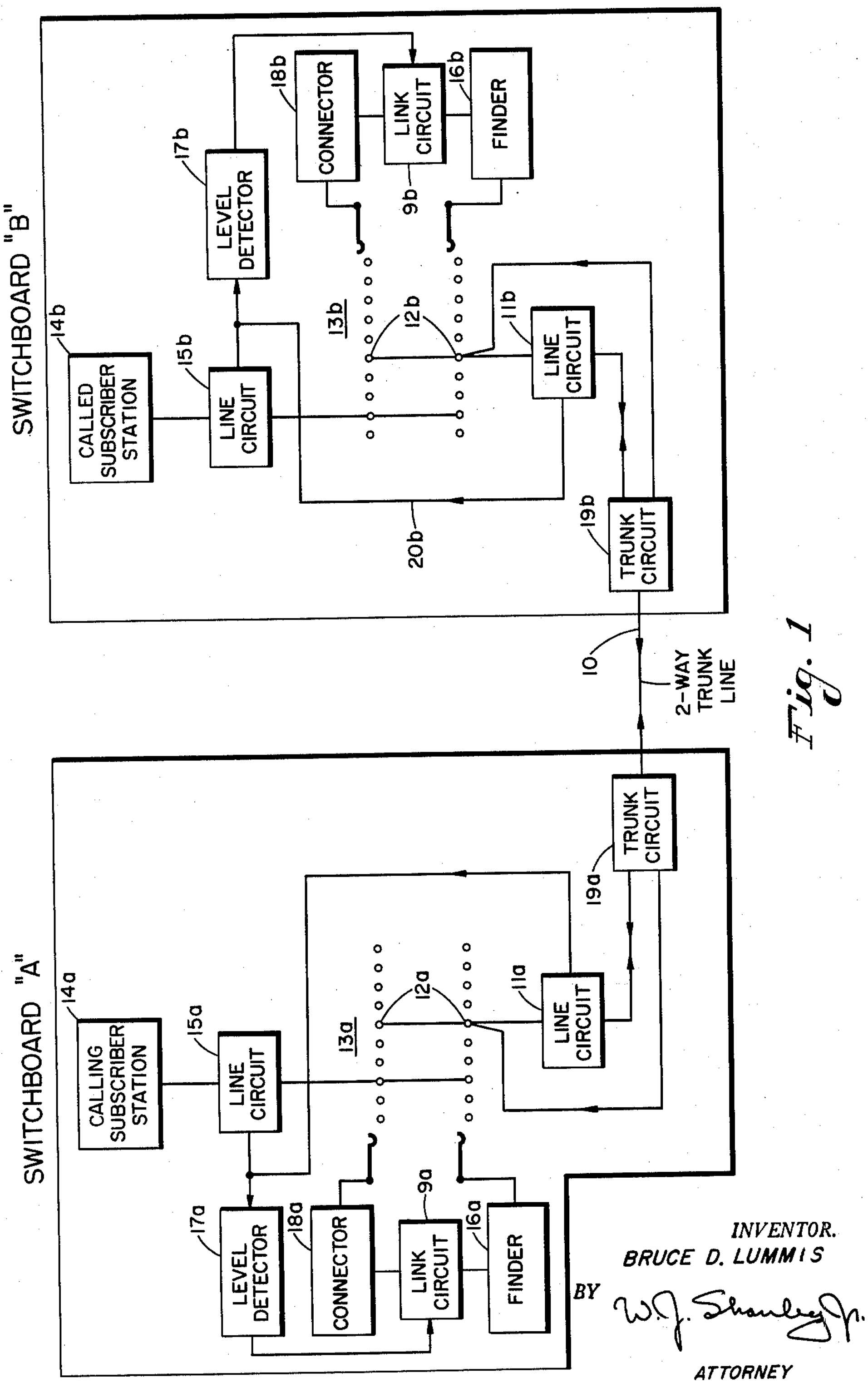
Figure 2:
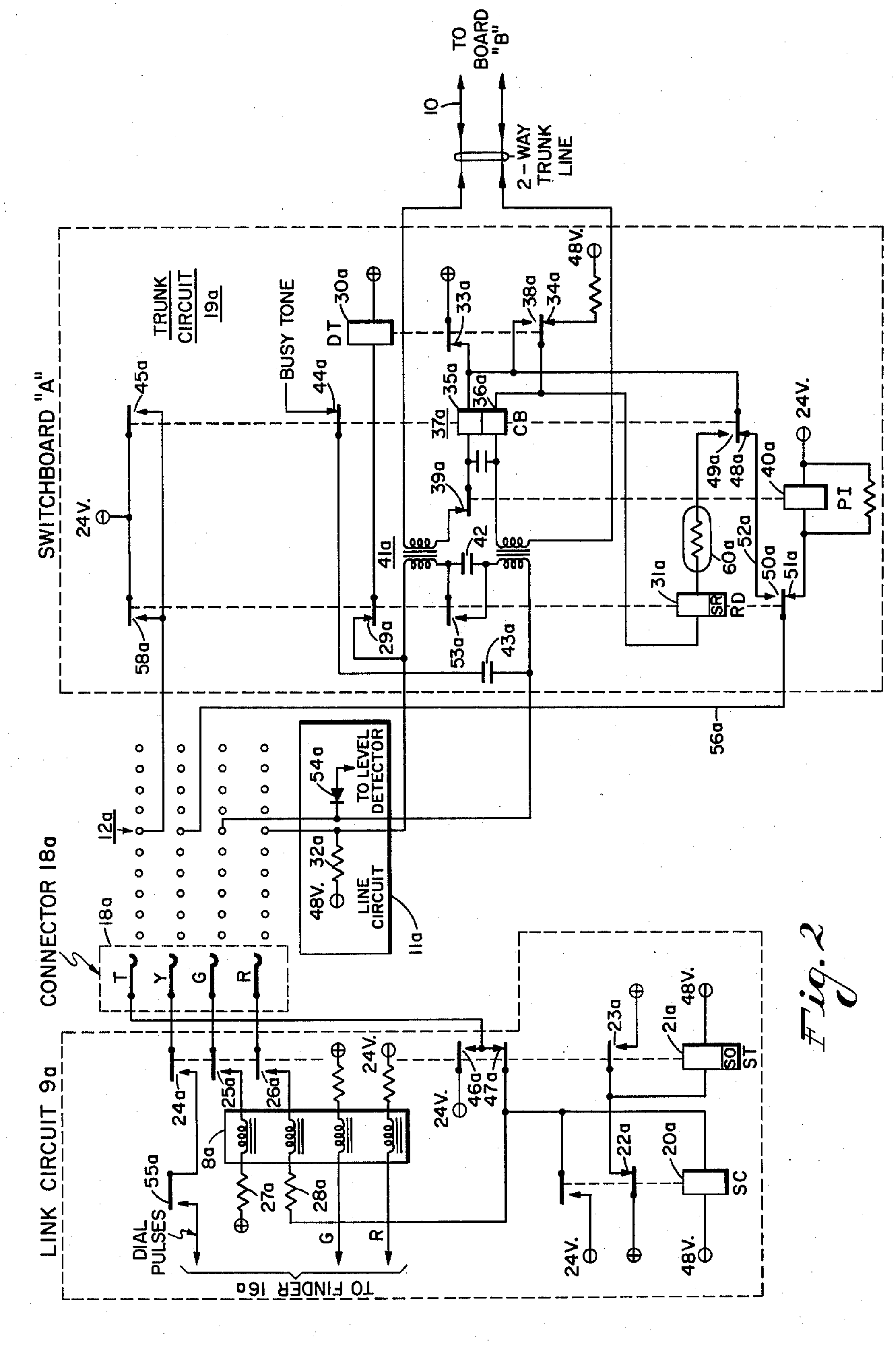
Figure 3A:
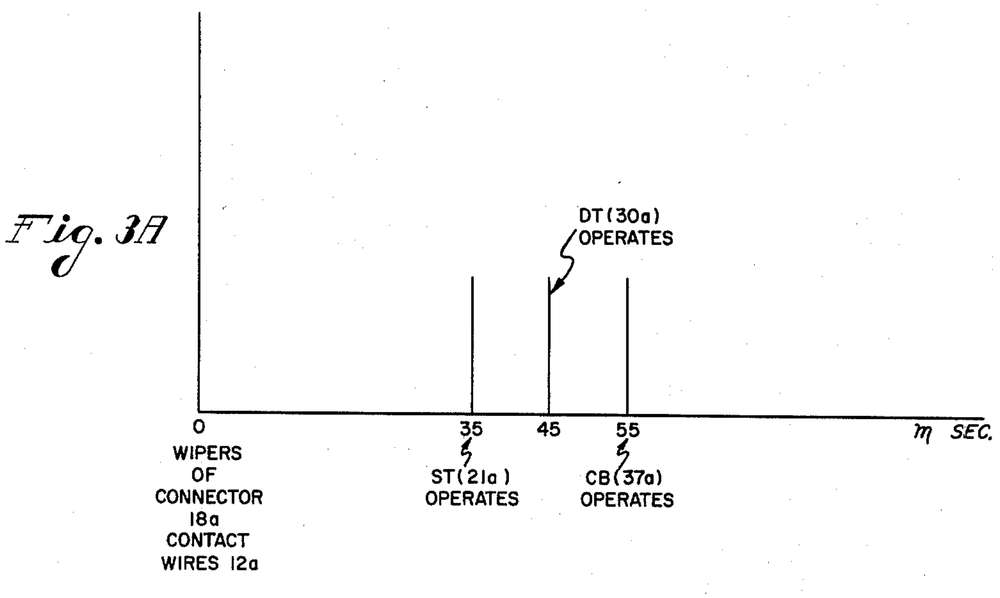
Figure 3B:
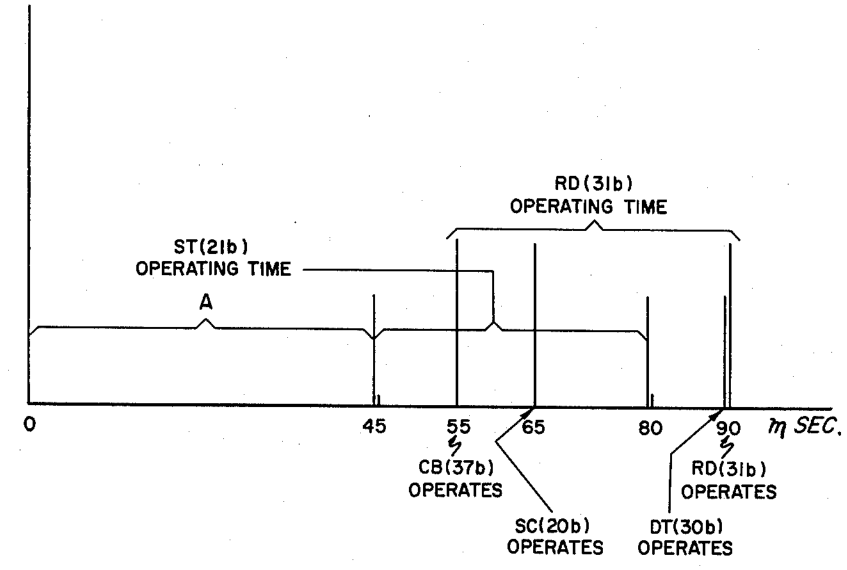

Other features and objects of my invention will become apparent as this description proceeds with reference to:

FIG. 1 which is a block diagram of the system of my invention;

FIG. 2 is a schematic diagram of a portion of a switchboard in accordance with the system of my invention; and FIGS. 3A and 3B are a timing diagram illustrating the function of the means for delaying the lockout of the seizing means of a called switchboard to prevent "head-on" conversation.

Referring now to FIG. 1, there is illustrated switchboard A and switchboard B, which are interconnected by two-way trunk line 10. Like components in the switchboards will be assigned like reference numerals with a suffix of *a* or *b* depending upon which board the component is found. In accordance with my invention, a single path of access to trunk line 10 is provided in each switchboard via line circuits 11*a* and 11*b*, respectively. These line circuits are connected to the wires in the sixth position in the illustrated level and thus are respectively connected to the group of wires 12*a* and 12*b* in the sixth position of illustrated wire banks 13*a* and 13*b*.

Assuming now that a subscriber at calling subscriber station 14*a* initiates a call to subscriber station 14*b*, line circuit 15*a* will initiate the operation of finder 16*a*. In the preferred embodiment of my invention, diode line circuits are utilized in association with a level detector which controls the finder action as is more fully explained in my copending application entitled "Telephone Line-finder," Serial No. 149,248, filed November 1, 1961. However, it will be recognized that my invention is not limited to use with the finder circuit disclosed in my prior copending application and a conventional finder utilizing line relays may be utilized.

In accordance with my prior copending application, when calling subscriber station 14*a* goes off-hook, line circuit 15*a* operates associated level detector 17*a*, which initiates the operation of finder 16*a*. When finder 16*a* finds line circuit 15*a*, connector 18*a* will thereafter be operated to wires 12*a* of the wire bank in response to switch directing signals from subscriber station 14*a* which correspond with the sixth position of the wire banks. Thus, calling station 14*a* will be linked with line circuit 11*a*.

In a manner which will hereinafter be more fully explained, the completion of this circuit will cause trunk circuit 19*a* to seize trunk line 10, assuming that the trunk line is then idle. Upon seizure of trunk line 10 by trunk circuit 19*a*, trunk circuit 19*b* causes line circuit 11*b* to institute the operation of finder 16*b* by energizing level detector 17*b* over conductor 20*b*. Fnder 16*b* then steps out into the wire banks to wires 12*b*. At this point, dial tone is then applied through line circuit 11*b*, trunk circuit 19*b*, trunk line 10, trunk circuit 19*a* and line circuit 11*a* through the finder, link circuit and connector to the line circuit 15*a* of the calling subscriber. The calling suscriber then dials the number of the called subscriber station. These dial pulses, or switch directing pulses, are then applied over trunk line 10 to trunk circuit 19*b*, and thence through the dial path established in finder 16*b* to the connector 18*b*. Thus, connector 18*b* steps out to the ninth position of wire banks 13*b* completing the connection to the line circuit associated with called subscriber station 14*b*.

Thus, in accordance with my invention, each switchboard has a single line circuit path of access to trunk line 10. The trunk circuits provide a means for busying the trunk line circuit of the called switchboard upon the seizing of the trunk line by the calling switchboard. Thus, the trunk line circuit is marked busy during the finder action to reach line circuit 15*b* to thereby prevent a later arriving connector in the called board from being connected to the trunk line circuit of the called switchboard thus resulting in a "head-on" situation.

Referring now to FIG. 2, which discloses those portions of the switchboards necessary for an understanding of my invention, it will be recognized that the circuitry of switchboard B is identical with that of switchboard A and, therefore, my explanation with respect to switchboard A will be equally applicable to switchboard B. The portion of switchboard A illustrated is that portion necessary to explain the operation of the system after connector 18*a* has arrived at wire group 12*a*.

Assuming now that trunk line 10 is idle and wipers T, Y, G and R are in contact with group of wires 12*a*, wiper T tests to determine if the line is busy. The busy condition is indicated by the presence of −24 volts on the T wire of group 12*a*. Since T does not find the busy marking potential, SC relay 20*a* remains in its unoperated state; thus, the slow operate ST relay 21*a* will operate from ground over contacts 22*a* of relay 20*a* to the −48 volt battery. Contacts 23*a* of ST relay 21*a* locks up ST relay 21*a* upon its operation. Upon operation of ST relay 21*a*, contacts 24*a* make to prepare a dialing path from subscriber station 14*a* to the Y wiper of the connector.

Make contacts 25*a* of the ST relay connect the G wiper to ground through one-half of the secondary winding of transformer 8*a* and resistor 27*a*. The operation of make contacts 26*a* in turn connects the R wiper of the connector to —48 volt battery through the other half of the secondary transformer 8*a*, resistance 28*a*, and SC relay 20*a*. The operation of ST relay 21 thus completes the talking circuit from the subscriber station to wires 12*a* of the wire banks through finder 16*a* and transformer 8*a*. In response to this connection, a low resistance connection to —48 volt battery is applied to operate DT relay 30*a* through break contacts 29*a* of RD relay 31*a*, the R wire of group 12*a*, the R wiper make contacts 26*a* resistance 28*a* and SC relay 20*a*. The DT relay will not have operated prior to the making of contacts 26*a* since the —48 volts applied to DT relay 30*a* through resistance 32*a* of line circuit 11*a* is insufficient to operate it due to the high value of resistance for resistor 32*a*.

Upon operation of DT relay 30*a*, break contacts 33*a* and 34*a* of relay 30*a*, respectively, disconnect terminals 35*a* and 36*a* of calling bridge relay 37*a* from ground and —48 volt battery and connect them together over make contacts 38*a*. This results in seizing trunk line 10 since DT relay 30*b* of switchboard B will be in its normal unoperated condition and, consequently, the operation of DT relay 30*a* will complete the loop through CB relays 37*a* and 37*b* to ground and —48 volt battery at switchboard B. Thus, both calling bridge CB relays 37*a* and 37*b* will operate over the loop since break contacts 39*a* and 39*b* are associated with unoperated pulse interrupting relays 40*a* and 40*b*.

To summarize, the completion of the talking path from calling subscriber station 14*a* to the G and R wires of group 12*a* upon the operation of ST relay 21*a*, operates DT relay 30*a* which seizes trunk line 10. Since the G and R wires of group 12*a* are connected across the primary of balanced transformer 41*a* through condenser 42, the talking path is thus extended from the subscriber station to the primary of transformer 41*a* upon the operation of ST relay 21*a*.

Upon operation of CB relay 37*a*, the busy tone path to the G wire of the wire banks through capacitor 43*a* is broken at break contacts 44*a*. Make contact 45*a* of relay 37*a* applies a —24 volt busy marking potential to the T wire of the wire banks. However, this wire already is marked busy upon the operation of ST relay 21*a* through make contacts 46*a*. In addition, contact 45*b*, associated with CB relay 37*b* of switchboard B, is also operated to mark busy the T wire of group 12*b* of the called board upon seizing of trunk line 10. Thus, later arriving connectors will be denied access to wires 12*b* since SC relay 20*b* of the called board will operate over the circuit traced from the —24 volts on the T wiper through unoperated break contacts 47*b* to —48 volt battery. Operation of relay 20*b* will thus open the operating path of ST relay 21*b* at contacts 22*b*, thereby preventing it from switching through a later arriving connector in switchboard B.

Upon operation of calling bridge relay 37*a*, make contacts 49*a* are operated to connect RD relay 31*a* across terminals 35*a* and 36*a* of the calling bridge relay. However, since DT relay 30*a* has operated, these points are tied together and, consequently, RD relay 31*a* that is the RD relay of the calling switchboard, will be shorted out through make contacts 38*a*. Consequently, break contacts 51*a* will remain unoperated, thus maintaining the operating path for PI relay 40*a*.

Referring now to switchboard B, the operation of CB relay 37*a* results in applying the —24 volt busy marking potential to the T wire of group 12*b* over make contact 45*b*, as was hereinbefore explained. In addition, busy tone is removed from the G wire of group 12*b* upon operation of break contacts 44*b*. Make contacts 49*b* are also operated to connect RD relay 31*b* across terminals 35*b* and 36*b*. Consequently, RD relay 31*b* will operate since terminals 35*b* and 36*b* are, respectively, connected to ground at —48 volts through the break contacts of unoperated DT relay 30*b*.

The operation of RD relay 31*b* prepares a dialing path for applying dial pulses to the Y wire of group 12*b* through make contacts 50*b*. The operation of make contacts 53*b* institute the finder operation in the called board by removing the back bias on diode 54*b* causing it to conduct and operate the level detector in a manner more fully explained in the above noted prior copending application. As is fully disclosed in my prior copending application, the operation of level detector 17*b* starts link circuit 9*b*, which causes the operation of finder 16*b* to result in its wipers T, Y, G and R making contact with the corresponding wires of group 12*b*. Upon completion of the finder operation, the talking circuit extended to line circuit 11*b*, upon seizure of trunk line 10 by switchboard A, will then be extended to the primary windings of transformer 26*b* within link circuit 9*b* and dial tone will then be fed back in a conventional manner over the talking path back to the calling subscriber at station 14*a*. In response to the receipt of the dial tone, the calling subscriber at station 14*a* then dials the number assigned to the called subscriber station 14*b* and forwards dial pulses over the dial circuit to drive the connector 18*b* to the position in wire banks 13*b* (i.e. the ninth position of the illustrated level), thus completing a connection with line circuit 15*b*.

This dial circuit is established as follows. The dial pulses emanating from subscriber station 14*a* are applied through make contacts 55*a* of SC relay 20*a*, make contacts 24*a* of operated ST relay 21*a*, wiper Y, the Y wires of group 12*a*, conductor 56*a*, and break contacts 51*a* of unoperated RD relay 31*a* to operate pulse interruption relay 40*a*. Operation of PI relay 40*a* breaks the trunk line loop at break contact 39*a*, thus causing CB relays 37*a* and 37*b* to be pulsed in response to the dial pulses generated at subscriber station 14*a*.

The pulsing of CB relay 37*b* places a pulsing ground on conductor 56*b* through unoperated break contacts 33*b*, its pulsing contacts 48*b*, conductor 52*b*, and make contacts 50*b* of operated RD relay 31*b*.

RD relay 31*b* will not drop out during the pulsing of CB relay 37*b* since its release time is long enough for it to hold during the pulsing of contacts 49*b*. This assures that the busy marking potential applied by make contacts 58*b* will remain on the T wire of group 12*b* to assure busy lockout of other connectors of switchboard B during the times that CB relay 37*b* is deenergized during pulsing.

The slow release characteristics of RD relay 31*b* also assures that contact 53*b* will not break during the dialing of the second group of digits since to do so would cause the Y stop relay (not illustrated) of finder 16*b* to drop out, thus opening the voice path and the dialing path in a manner which may be more clearly seen in my prior copending application. It suffices here to say that contact 53*b* functions as if it were the hook-switch of a calling subscriber in switchboard B. Consequently, the breaking of contact 53*b* operates just as if the calling party went on-hook during the dialing of the called party's number.

Make contacts 52*b* of RD relay 31*b* also have to remain in their operated condition during the dialing of the second group of digits in order that the path for applying dial pulses to the Y wiper of finder 16*b* will be maintained.

Connector 18*b* then operates in a conventional manner in response to the dial pulses applied to wiper Y of finder 16*b* to establish a talking path between calling subscriber station 14*a* and called subscriber station 14*b* via line circuit 15*b*.

To recapitulate, each switchboard has a single path of access to the trunk line through its line circuit, thus simplifying the switchboards by obviating the necessity for incoming connectors or additional line circuits. Furthermore, in accordance with my invention, the incidence of "head-on" problems are greatly reduced by providing by-path busying of the trunk circuit line of the called switchboard during its finder action to reach the calling trunk line.

In order to further minimize the "head-on" situation, means is provided for delaying the operation of the RD relay of the called switchboard, i.e., RD relay 31*b*. This delay is provided by thermistor 60*b* which delays the operation of relay 31*b* so that if any other connector in switchboard B is in the process of being switched through to the trunk line, it will be allowed to do so in order to complete a busy tone path to the calling subscriber in switchboard B. Thus, both calling parties receive a busy signal instead of being connected "head-on." Such a situation occurs if a connector in switchboard B arrives at group of wires 12*b* at such a time, with respect to the time of operation of connector 18*a*, that ST relay 21*b* will have started to operate before the T wiper of connector 18*b* is marked busy by the operation of CB relay 37*b*. If ST relay 21*b* has received a long enough pulse, so that it continues to operate to thus result in the "head-on" situation developing on the trunkline, it will find contact 29*b* in its unoperated position so that DT relay 30*b* will operate. Thus, if any ST relay of the later arriving connector in the called switchboard is going to operate to connect to the trunk line, it is highly desirable that contact 29*b* remain in its unoperated position during any such interval so that DT relay 30*b* can operate. Thus, since both DT relay 30*a* and DT relay 30*b* have operated, the trunk loop is opened by removing battery upon the operation of the second one of these relays, thereby causing CB relays 37*a* and 37*b* to drop out. Busy tone is thus reapplied over contacts 44*a* and 44*b* to both calling parties which are connected in a "head-on" fashion to trunk line 10. Thus, thermistors 60*a* and 60*b* are provided so as to assure that if two different connectors are switched through to the trunk line, both of the DT relays will also operate so as to break the trunk loop and give a busy indication to both calling parties instead of connecting these parties in conversation.

Referring now to FIG. 3, which discloses the relative operating times of the various relays in switchboard A and switchboard B in accordance with the preferred embodiment of my invention, typical operating times have been assigned to each relay to facilitate a discussion of the manner of selecting the delay necessary to be introduced by thermistors 60*a* and 60*b*.

FIG. 3A illustrates the timing of the operation, in switchboard A, of ST relay 21*a*, DT relay 30*a* and CB relay 37*a* with respect to the time that the wipers of connector 18*a* arrive at wires 12a. FIG. 3B discloses the sequence of operation of the relays of switchboard B plotted on the same time basis as that of FIG 3A.

Assume now that a subscriber's station in switchboard B also dials the numbers to gain access to trunk line 10 at a time such that it results in connector 18*b* in switchboard B having its wipers contact the group of wires of group 12*b* shortly after the wipers of connector 18*a* contact the wires of group 12*a*. The following are average operating times in the preferred embodiment of my invention for the following relays:

ST=35 milliseconds
DT=10 milliseconds
CB=10 milliseconds
SC=10 milliseconds
RD=20 milliseconds
Thermistor 60=15 milliseconds The time that the wipers of connector 18*a* arrive at the wires of group 12*a* will be the zero reference point time. Thirty-five milliseconds later, ST relay 21*a* will operate since it is assumed that at this point the trunk circuit is idle and, consequently, SC relay 20*a* remains unoperated. DT relay 30*a* will then operate ten milliseconds later and in a further ten millisecond interval, CB relays 37*a* and 37*b* operate.

Referring now to FIG. 3B, if relay 37*b* operates at fifty-five milliseconds, the T wire of group 12*b* will be marked busy by make contacts 45*b* at that time. Assuming now that the wipers of connector 18*b* contact wires 12*b* at any time during period A, i.e. during the period from zero time to shortly prior to forty-five milliseconds, ST relay 21*b* will operate since this relay will operate upon receipt of a pulse of twenty milliseconds, or greater. A twenty milliseconds, or greater, pulse will be applied to ST relay 21*b* if its connector contacts wires 12*b* during period A since it takes ten milliseconds for SC relay 20*b* to operate after the busy marking potential is applied by CB relay 37*b*. Therefore, SC relay 20*b* will operate at sixty-five milliseconds, which is over twenty milliseconds after the end of the period A. Therefore, ST relay 21*b* will operate and lock-up on contacts 23*b* shortly prior to eighty milliseconds, assuming connector 18*b* hits the wires of group 12*b* at the end of period A. It will be recognized that if the connector in switchboard B hits the wires of group 12*b* after the end of period A, SC relay 20*b* will operate before ST relay 21*b* has received a twenty millisecond pulse and, consequently, ST relay 21*b* will not operate. Therefore, since the latest time at which ST relay 21*b* will operate is at a point shortly prior to eighty milliseconds after the wipers of connector 18*a* contact wires 12*a*, the latest time at which DT relay 30*b* will operate is at a point in time shortly prior to ninety milliseconds. Consequently, the operating point of RD relay 31*b* must be beyond this point in time, which means that it should not operate prior to ninety milliseconds. Therefore, thermistor 60*b* must contribute fifteen milliseconds delay to give a total operating time of thirty-five milliseconds. The insertion of thermistors 60*b* in series with RD relay 31*b* eliminates an unguarded interval which would be present if ST relay 21*b* operated but was not able to operate DT relay 30*b* due to the operation of RD relay 31*b*. Therefore, assuming these average operating times, the unguarded interval is further reduced so as to be theoretically eliminated. However, it is recognized that the tolerances in the manufacture of these relays will cause their operating times to vary, but it is felt that, on the average, the chance of "head-on" situations is further minimized by the addition of thermistor 60*b*.

While I have shown and described a specific embodiment of my invention, other modifications will readily occur to those skilled in the art. I do not, therefore, desire my invention to be limited to the specific arrangements shown and described, and I intend in the appended claims to cover all modifications within the spirit and scope of my invention.

What I claim is:

1. In an automatic telephone system the combination comprising: first and second switchboards for carrying conversations between a calling subscriber station which is connected to said first switchboard and a called subscriber station which is connected to said second switchboard; a plurality of subscriber stations connected to said switchboards; a trunk line for interconnecting said switchboards; each of said switchboards comprising wire banks, a connector switch, a line circuit associated with said trunk line and being connected to predetermined wires of said wire bank, means including said connector switch operative for completing a circuit from said calling subscriber station to said predetermined wires when said line circuit is idle in response to the receipt from said calling subscriber station of a first group of switch directing signals which identify said line circuit, and a trunk circuit comprising means for permanently connecting said trunk line to said line circuit, and means for seizing said trunk line when said trunk line is idle and when said connector switch connects said calling subscriber station to said line circuit so that said calling subscriber station is connected through said trunk line to the line circuit in said second switchboard which is associated with said trunk line and which is connected to predetermined wires in said second switchboard corresponding to said first switchboard predetermined wires.

2. The combination of claim 1 in which said trunk circuit in said second switchboard further comprises first means operative for sensing the seizure of said trunk line, and means operative in response to the operation of said first sensing means for marking busy said predetermined wires of said second switchboard, said completing means of said second switchboard being inoperative when its connector switch lands on wires that are marked busy thereby denying access to said line circuit and said trunk line by later arriving connectors.

3. The combination of claim 2 in which said trunk circuit further comprises means for normally applying busy signals to its corresponding line circuit as long as its first sensing means remains unoperated.

4. The combination of claim 3 in which said trunk circuit of said second switchboard further comprises second means operative for sensing that said first sensing means of said second switchboard and said seizing means of the first switchboard are in their unoperated conditions, and means for preventing the operation of the seizing means of the second switchboard in response to the operation of said second sensing means.

5. The combination of claim 4 in which said completing means of the second switchboard further comprises a linefinder, and said trunk circuit of said second switchboard further comprises means operative for placing a marking potential on one of said predetermined wires through said line circuit in response to the operation of said second sensing means to thereby start the linefinder operation.

6. The combination of claim 5 in which said trunk circuit of said second switchboard further comprises means operative for placing a busy marking potential upon another of said predetermined wires of the second switchboard in response to the operation of said second sensing means.

7. The combination of claim 6 in which said circuit established upon operation of said completing means of said first switchboard comprises a talking circuit and a switch directing signal circuit to said predetermined wires, said trunk circuit of said first switchboard further comprising means for interrupting said extended connection between said line circuits in response to the receipt of a second group of switch directing signals over said switch directing signal path, said first sensing means of said second switchboard being alternately rendered operative and inoperative in response to the interrupting of said connection, said second sensing means being a slow release device so that it remains in its operated condition during the receipt of said switch directing signals, and means for generating and applying switch directing signals to one of said predetermined wires of said second switchboard whereby said connector of said second switchboard is controlled by said second group of switch directing signals.

8. The combination of claim 4 in which said trunk circuit of said second switchboard further comprises means for delaying the operation of said second sensing means a predetermined time after both said first sensing means of said second switchboard and said seizing means of said first switchboard are in their operated conditions, said predetermined delay time being sufficient to allow the operation of the seizing means of the second switchboard during said predetermined interval if the completing means of the second switchboard was in the process of operating for a long enough period of time before said predetermined wires were marked busy, so as to continue to operate after said predetermined wires were marked busy, said first and second sensing means being rendered inoperative upon the operation of the seizing means of the second switchboard to thereby return a busy signal to the original calling subscriber at the calling switchboard as well as the second calling subscriber at the second switchboard who attempted to make an outgoing call over said trunk line from said called switchboard.

9. In an automatic telephone system the combination comprising: first and second switchboards; a plurality of subscriber stations connected to said switchboards; a trunk line comprising a single pair of wires interconnecting said switchboards for carrying conversations between a calling subscriber station which is connected to said first switchboard and a called subscriber station which is connected to said second switchboard; each of said switchboards comprising wire banks, a connector switch, a line circuit connected to predetermined wires of said wire bank, means including said connector switch operative for completing a circuit from said calling subscriber station to said predetermined wires when said line circuit is idle in response to the receipt from said calling subscriber station of a first group of switch directing signals which identify said line circuit, a trunk circuit comprising means for permanently said trunk line to said line circuit, a source of potential having first and second terminals, first switching means for connecting one of said wires of said pair to said first terminal and the other wire of said pair to said second terminal when said first switching means is in its unoperated condition, means responsive to the completion of said circuit between said calling subscriber station and said predetermined wires for operating said first switching means to its operated condition, said first switching means serving, when in its operated condition, to seize said trunk line by disconnecting said wires from said source of potential and connecting the two wires together to thereby complete a loop circuit running from the first terminal of the source of potential of the second switchboard through one side of the trunk line and returning to the second terminal of said source of potential at the second switchboard through the other side of said trunk line.

10. The combination of claim 9 in which said trunk circuits of said first and second switchboards each further comprises first switch controlling means operative in response to the completion of said trunk loop circuit, and second switching means operative in response to the operation of said first switch controlling means for placing a busy marking potential on one of said predetermined wires in the same switchboard, each of said completing means being inoperative when its connector switch lands on said one of said predetermined wires having said busy marking potential thereon, to thereby deny access to its associated line circuit and said trunk line.

11. The combination of claim 10 in which each of said trunk circuits further comprises third switching means for applying, when in its unoperated condition, busy signals to said line circuit in the same switchboard, said third switching means being operative to its operated condition in response to the operation of said first switch controlling means to thereby remove busy signals from said line circuit in the same switchboard.

12. The combination of claim 11 in which each of said trunk circuits further comprises second switch controlling means operative in response to it being connected across a source of potential, fourth switching means operative for connecting said second switch controlling means across said source of potential through said first switching means when said first switching means is in its unoperated condition in response to the operation of said first switch controlling means, and fifth switching means responsive to the operation of said second switch controlling means for preventing the operation of said means for operating said first switching means, whereby said second switch controlling means of the second switchboard will operate and prevent the seizing of said trunk line by preventing the operation of said first switching means.

13. The combination of claim 12 in which each of said trunk circuits further comprises sixth switching means for applying an off-hook marking potential through said line circuit to one of said predetermined wires in response to the operation of said second switch controlling means.

14. The combination of claim 13 in which each of said trunk circuits further comprises seventh switching means for placing a busy marking potential upon another of said predetermined wires in response to the operation of said second switch controlling means.

15. The combination of claim 14 in which said circuit established upon operation of said completing means of said first switchboard comprises a talking circuit and a switch directing signal circuit, said trunk circuit of said first switchboard further comprising means connected to said switch directing signal circuit for interrupting said loop circuit in response to the receipt of a second group of switch directing signals when said second switch controlling means of said first switchboard is in its unoperated condition, said second switch controlling means being a slow-release device so that it remains in its operated condition during the receipt of said second group of switch controlling signals, said trunk circuit of the second switchboard further comprising means for establishing a second switch directing signal path connected to one of said predetermined wires of said second switchboard when said second switch controlling means is in its operated condition, and eighth switching means for selecting one end of said second path to said source of potential through the unoperated fifth switching means in response to said first switch controlling means being rendered inoperative upon the interruption of said trunk circuit.

References Cited by the Examiner

UNITED STATES PATENTS

| | | | |
|---|---|---|---|
| 1,903,837 | 4/33 | Richardson | 179—18 |
| 2,794,121 | 8/57 | Bjornson | 179—18 |

ROBERT H. ROSE, *Primary Examiner.*

WALTER L. LYNDE, *Examiner.*